US007950695B2

(12) United States Patent
Cui

(10) Patent No.: US 7,950,695 B2
(45) Date of Patent: May 31, 2011

(54) SAFETY GUARD MECHANISM FOR LIFTING DEVICE

(76) Inventor: Kan Cui, Sammamish, WA (US)

( * ) Notice: Subject to any disclaimer, the term of this patent is extended or adjusted under 35 U.S.C. 154(b) by 282 days.

(21) Appl. No.: 12/292,120

(22) Filed: Nov. 12, 2008

(65) Prior Publication Data

US 2009/0174176 A1 Jul. 9, 2009

Related U.S. Application Data

(60) Provisional application No. 61/006,270, filed on Jan. 3, 2008.

(51) Int. Cl.
*B60R 21/00* (2006.01)
*B60S 9/00* (2006.01)
*B62D 49/08* (2006.01)
*B66C 23/78* (2006.01)

(52) U.S. Cl. ......................... 280/755; 212/302; 212/305

(58) Field of Classification Search .................. 280/755, 280/763.1, 764.1; 180/41; 187/222, 223, 187/224, 232; 212/302, 305
See application file for complete search history.

(56) References Cited

U.S. PATENT DOCUMENTS

| | | | | |
|---|---|---|---|---|
| 2,408,500 | A | 10/1946 | West | |
| 3,836,012 | A * | 9/1974 | Grider et al. | 212/304 |
| 4,175,644 | A | 11/1979 | Sikli | |
| 4,401,408 | A | 8/1983 | Gibert | |
| 5,439,343 | A | 8/1995 | Watson | |
| 5,685,563 | A | 11/1997 | Ottestad | |
| 5,890,737 | A | 4/1999 | Hutka | |
| 6,152,486 | A | 11/2000 | Pierce | |
| 6,425,459 | B1 | 7/2002 | Keefer | |
| 6,431,319 | B1 | 8/2002 | Myers et al. | |
| 6,561,546 | B2 | 5/2003 | Puszkiewicz et al. | |
| 7,281,736 | B2 | 10/2007 | Sannah et al. | |

FOREIGN PATENT DOCUMENTS

| | | |
|---|---|---|
| DE | 201 16 122 U1 | 2/2002 |
| FR | 2 548 996 | 1/1985 |
| JP | 5-262209 | 10/1993 |

* cited by examiner

*Primary Examiner* — Paul N. Dickson
*Assistant Examiner* — Joselynn Y. Sliteris
(74) *Attorney, Agent, or Firm* — Richard C. Litman

(57) ABSTRACT

The safety guard mechanism for a lifting device is a mechanism that can automatically deploy a safety guard pivotally mounted to the lower surface of the frame of a portable aerial lift device when the lift is raised. By lowering the guard member, the distance between the lower surface of the base and the ground is decreased. The helical screw-based mechanical device includes a mechanical translator coupled with a rotator, the entire assembly interconnecting the guard member and a scissors-type lift so that raising the lift drives the lowering of the guard member. In the lowered position, the guard prevents tipping of the lift should one or more wheels enter a pothole or other depression. A helical screw latch is included to provide a self-locking feature.

12 Claims, 16 Drawing Sheets

SAFETY GUARD MECHANISM FOR LIFTING DEVICE

CROSS-REFERENCE TO RELATED APPLICATION

This application claims the benefit of U.S. Provisional Patent Application Ser. No. 61/006,270, filed Jan. 3, 2008.

BACKGROUND OF THE INVENTION

1. Field of the Invention

The present invention generally relates to pothole safety guards for lifting machines, and particularly to a safety guard mechanism for a lifting device, such as a scissors-type aerial lift, that uses a helical screw and roller mechanism to deploy the safety guard for preventing the lifting device from tipping over when a pothole or similar tipping hazard is encountered.

2. Description of the Related Art

Aerial platforms allow users to perform work at or lift materials to elevated locations. Typically, a work platform comprises a scissor-style lift on which a platform is secured. The lift and platform are mounted on a motorized chassis or mainframe that is provided with wheels. While positioned on the platform, the user can control the elevation of the platform and the speed and direction of the chassis. When the platform is raised, the center of gravity of the aerial platform is raised, creating a risk that the device will tip over in high winds, or when the wheel slips into a pothole next to the wheel. Other lifting devices, such as backhoes and other construction equipment, have similar problems with stability. Such problems arise when one or more of the wheels hits a pothole, runs off a curb or encounters similar barriers that can cause the work platform to tip over causing damage and perhaps serious injury.

There are numerous anti-tipping deployment schemes, most having a plethora of moving parts that can lead to catastrophic failure of the system should any one of the parts malfunction. Most of the existing systems are linkages, rollers, air springs or springs, hinge pins, bolts and nuts and the like. Many of the functional parts involved in legacy systems are springs or gas springs designed to hold the safety guard when deployed.

If these springs fail when activated, the pothole safety guards will be freely suspended in the air, unable to perform their function. None of the existing designs has a self-lock security against spring failures. The art would certainly welcome an efficient device that would deploy anti-tipping members on a work platform, thereby preventing damage and/or injury.

Thus a safety guard mechanism for a lifting device solving the aforementioned problems is desired.

SUMMARY OF THE INVENTION

The safety guard mechanism for a lifting device is a mechanical device that can automatically deploy a safety guard member mounted to the lower surface of the base of a portable aerial lift device or other lifting device when the lift is raised. By lowering the guard member, clearance between the lower surface of the base and the ground is decreased, thereby reducing the chance of tipping if the wheels of the lift device hit a pothole or encounter any other tipping hazard. The mechanism has a helical screw-based mechanical device that includes a mechanical translator reciprocally and slidably coupled to a helically channeled rotator via a roller. The entire assembly interconnects the guard member and a scissors-type lift so that raising the lift drives the lowering of the guard member. In the lowered position, the guard prevents tipping of the lift should one or more wheels enter a pothole or other depression. A helical screw latch is included to provide a self-locking feature.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
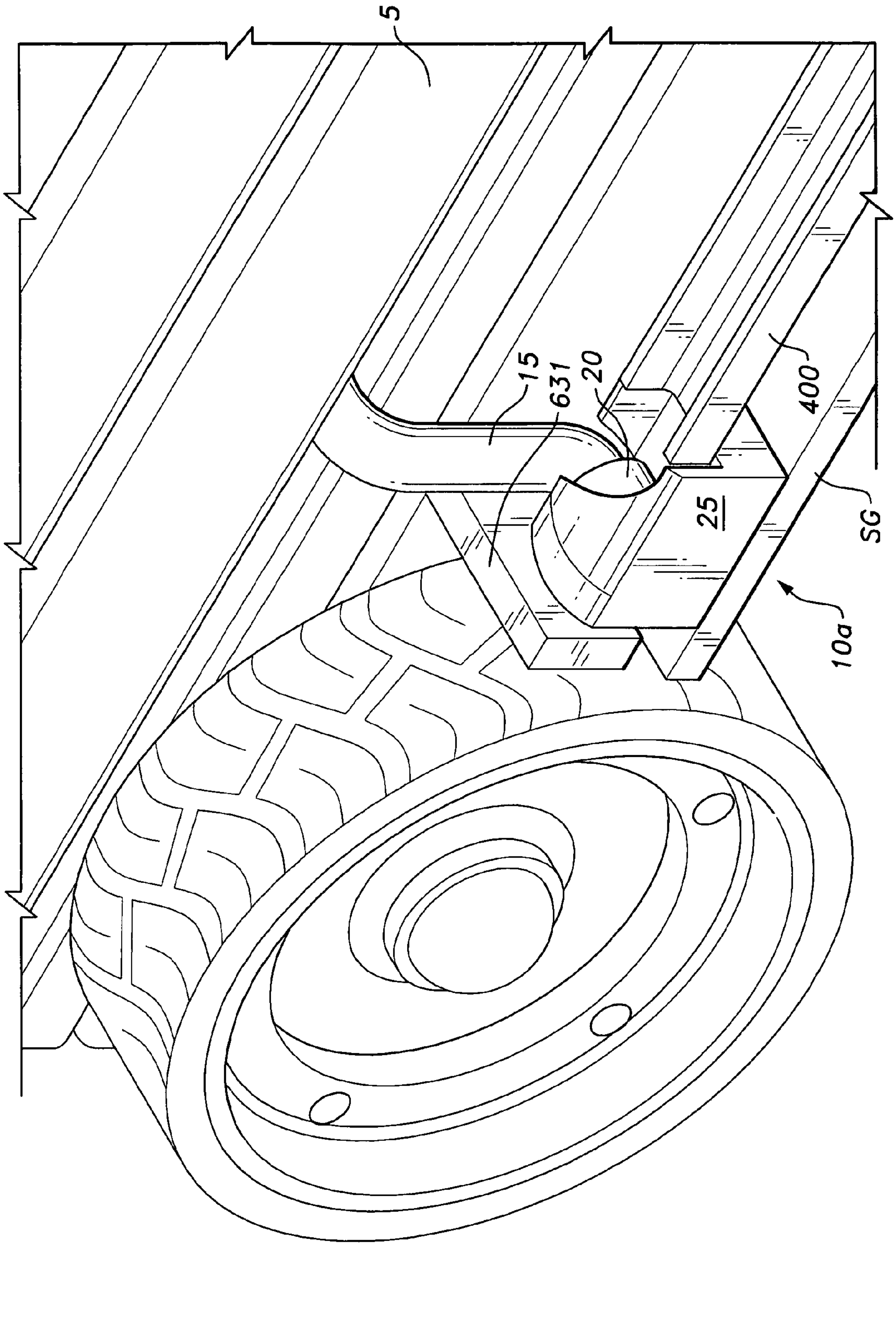
FIG. 1 is an environmental, perspective view of a first embodiment of a safety guard mechanism for a lifting device according to the present invention.
Figure 2:
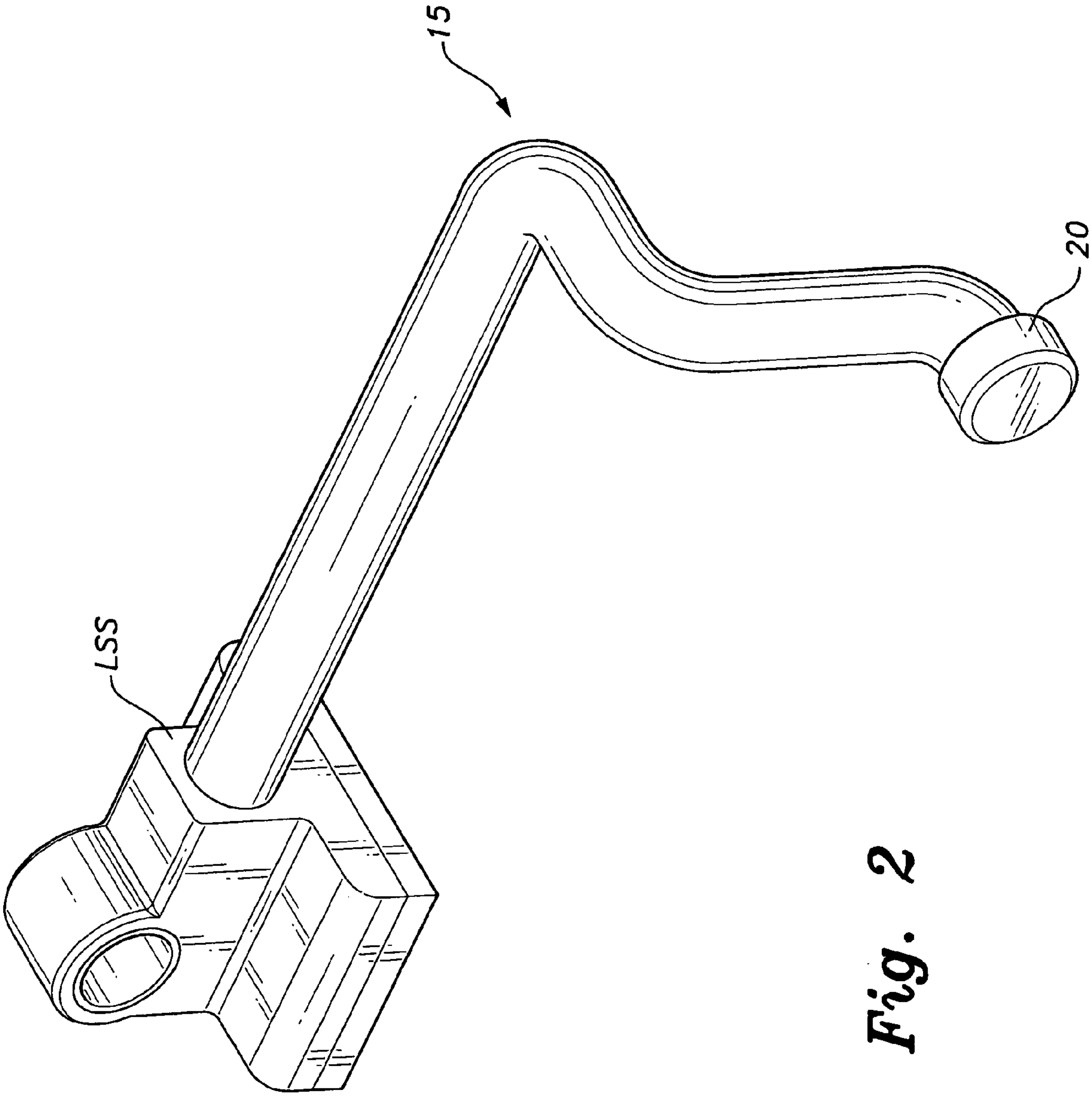
FIG. 2 is a perspective view of a linkage and roller of the safety guard mechanism of FIG. 1.
Figure 3:
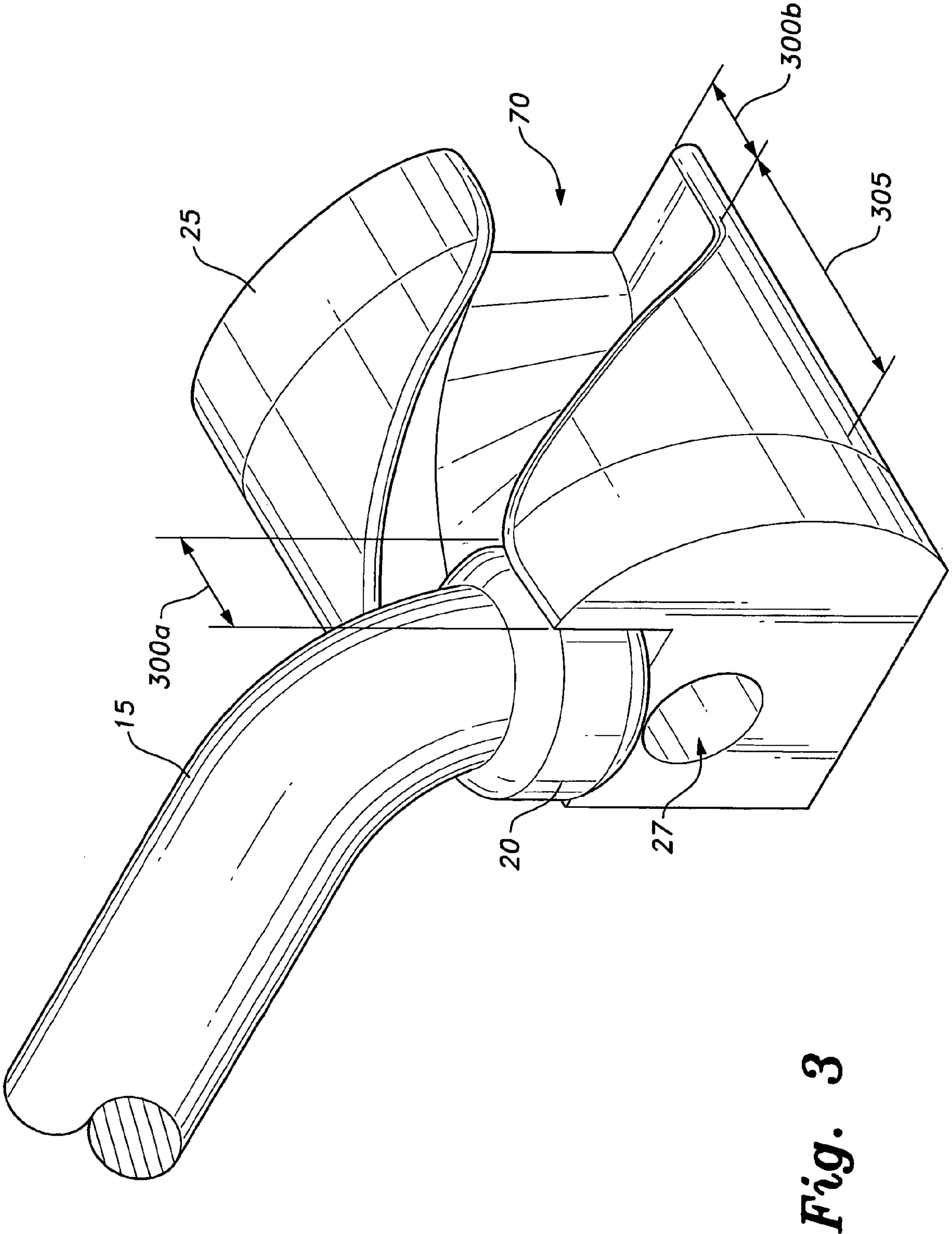
FIG. 3 is a perspective view of the roller engaging the helical rotator of the driving set of the safety guard mechanism of FIG. 1.

As shown in FIGS. 1-3, the present invention relates to a safety guard mechanism for a lifting device that includes a mechanical device having a helically channeled body 25 coupled to a roller driving set 15 that can automatically deploy a guard member SG mounted to the lower surface of the base of a portable aerial lift device 5 or other lifting device when the lift is raised. By lowering the guard member SG, the clearance between lift device 5 and the ground is decreased, reducing the risk that the lifting device may tip over if the wheel slips into a pothole or other surface irregularity, as well as providing protection against winds or other forces that might result in a moment arm that could apply torque to tip the lifting device.

The helical screw-based mechanical device includes a mechanical translator reciprocally coupled to a helically channeled rotator via a roller. The entire assembly interconnects the guard member and a scissors-type lift so that raising the lift causes positive rotation in the rotator to thereby lower the guard member to a deployed or extended position. Conversely, lowering the lift causes negative rotation in the rotator to thereby raise the guard member to a retracted position.

Preferably, at least two guard members SG are disposed on two opposing sides of the vehicle 5 to prevent tipping motion of the vehicle. In the lowered position, the guards SG prevent tipping of the lift should one or more wheels enter a pothole or other depression. A latch for the helically channeled body is included to provide a self-locking feature.

The safety guard mechanism is based on the fact that linear motion in a translation member can result in rotation of a coupled rotation member having appropriately specified screw parameters, such as an appropriately specified helical thread angle. Utilizing the aforementioned principle, linear motion from a linkset slider 15 disposed on vehicle 5 can be translated to rotation of coupled rotator body 25 linked to the safety guards SG to extend and retract the guards SG on aerial lift 5. The rigid translation member 15 travels in the direction of the longitudinal axis of the cylindrical rotator body 25 in FIG. 4. The linear motion of rigid translation member 15 causes the roller 20, which is rotatably attached to the end of translation member 15, to travel linearly while engaging the helical channel of the cylindrical rotator body 25, thereby imparting rotational movement to the rotator body 25.

The rotator body 25 can complete an entire 360° revolution about the rotator body longitudinal axis as the translation member 15 linearly travels a distance of one thread lead distance on rotation channel 80*a* or 80*b*.

As shown in FIG. 3, a linear movement of mechanical translator 15 through one-quarter of the helical thread lead distance causes a 90° rotation of rotator body 25. In most designs of aerial lifts, only about 90° of safety guard rotation is needed. Thus, the corresponding one-quarter lead distance required for travel of drive set 15 results in a compact, shortened cylinder length design of rotator body 25.

FIG. 3 illustrates helical rotator 25 in perspective to expose the one-quarter lead length of the rotator 25. A pivotal attachment bore 27 is axially disposed through the rotator 25. A smoothly shaped straight (linear) lead-in channel section having length 300*a* merges with the beginning of helical channel 70, which has length 305, and a similarly shaped straight (linear) lead-out or exit channel section, which has length 300*b*, merges with the end of the helical channel 70.

The linear channel sections are provided to lock the rotator body 25 in a 0° configuration that retracts the guard member SG, or in a 90° configuration that extends the guard member SG, as the roller 20 travels in the straight channels. Thus, it should be understood that, so long as the translation member 15 is stopped in the lead-out section with the safety guard SG being extended by rotator 25, the safety guard SG has no way to be closed or retracted by external forces, thereby guaranteeing a virtually fool-proof safety lock of the guard SG.

Figure 4:
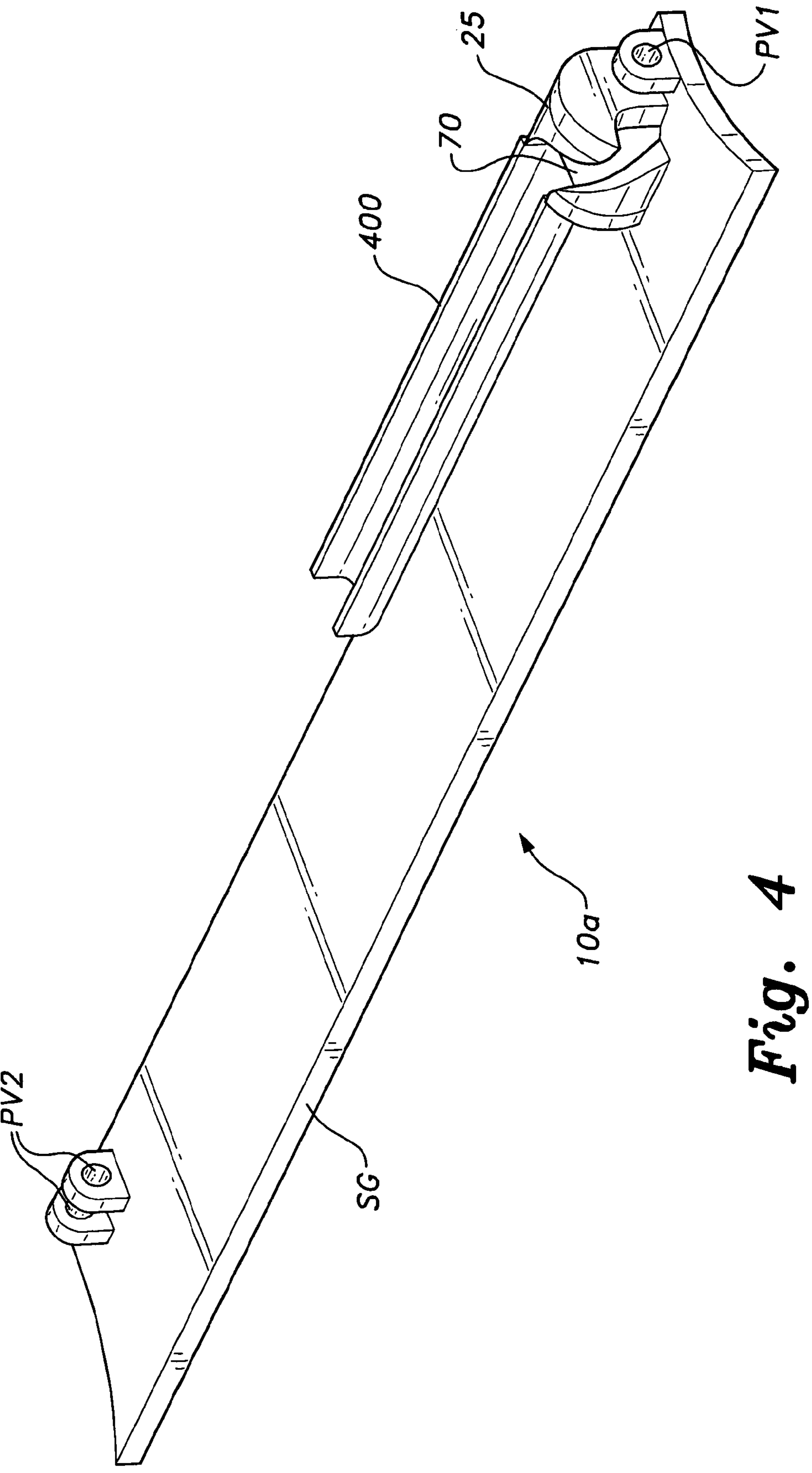
FIG. 4 is a perspective view of a helical rotator for a safety guard mechanism for a lifting device according to the present invention.

A first embodiment of the safety guard mechanism 10*a* is shown in FIG. 4 and comprises reinforcement by slider motion into extended straight lead-out channel 400. The front end of safety guard SG is fixed to the helical rotator 25 at attachment point PV1. Attachment point PV2 is provided to pivotally attach the safety guard SG to a fixed point on aerial lift vehicle 5, i.e., pins on the frame of the lifting device extend into the pivot bores PV1 and PV2. Helical channel 70 and extended straight channel 400 are preferably rigidly connected by a weldment. As shown in FIG. 2, the roller 20 is rotatably connected to an end of translation member 15. The remaining end of translation member 15 is rigidly connected to linkset slider LSS.

Referring again to FIG. 1, it is seen that the translation member 15 via linkset slider LSS is mechanically coupled to a moving scissor member, i.e., a linkset, of the lift vehicle 5. When the linkset of scissor lift is in a closed arm-link position, the translation member 15 positions roller 20 in the short lead-in channel of rotator body 25. As the linkset starts lifting, the link set slider LSS and translation member 15 move in a linear manner to cause the roller 20 to engage and travel through the helical channel section of rotator body 25, thereby rotatably deploying the safety guard SG into an open configuration, the safety guard pivoting on the pins inserted into pivot bores PV1 and PV2.

As the roller 20 completes the one-quarter of the screw lead distance and enters the lead-out straight channel at the end of the helical channel, the safety guard SG locks into a 90° fully opened or extended position. So long as the linkset of aerial lift vehicle 5 is raised, the translation member 15 locks the roller 20 in the extended straight channel to keep the safety guard SG in an open, deployed or extended position. It should be clearly understood that when the linkset of aerial lift vehicle 5 is lowered, the motion of translation member 15 reverses travel of the roller 20 through rotator body 25 to retract or close the safety guard SG into a retracted position. The safety guard mechanism 10*a* uses a minimal number of moving parts to achieve its function. However, the second and third embodiments, described below, obviate the necessity of having an extended straight lead-out channel and long, curved shape of the translation member 15.

Figure 6:
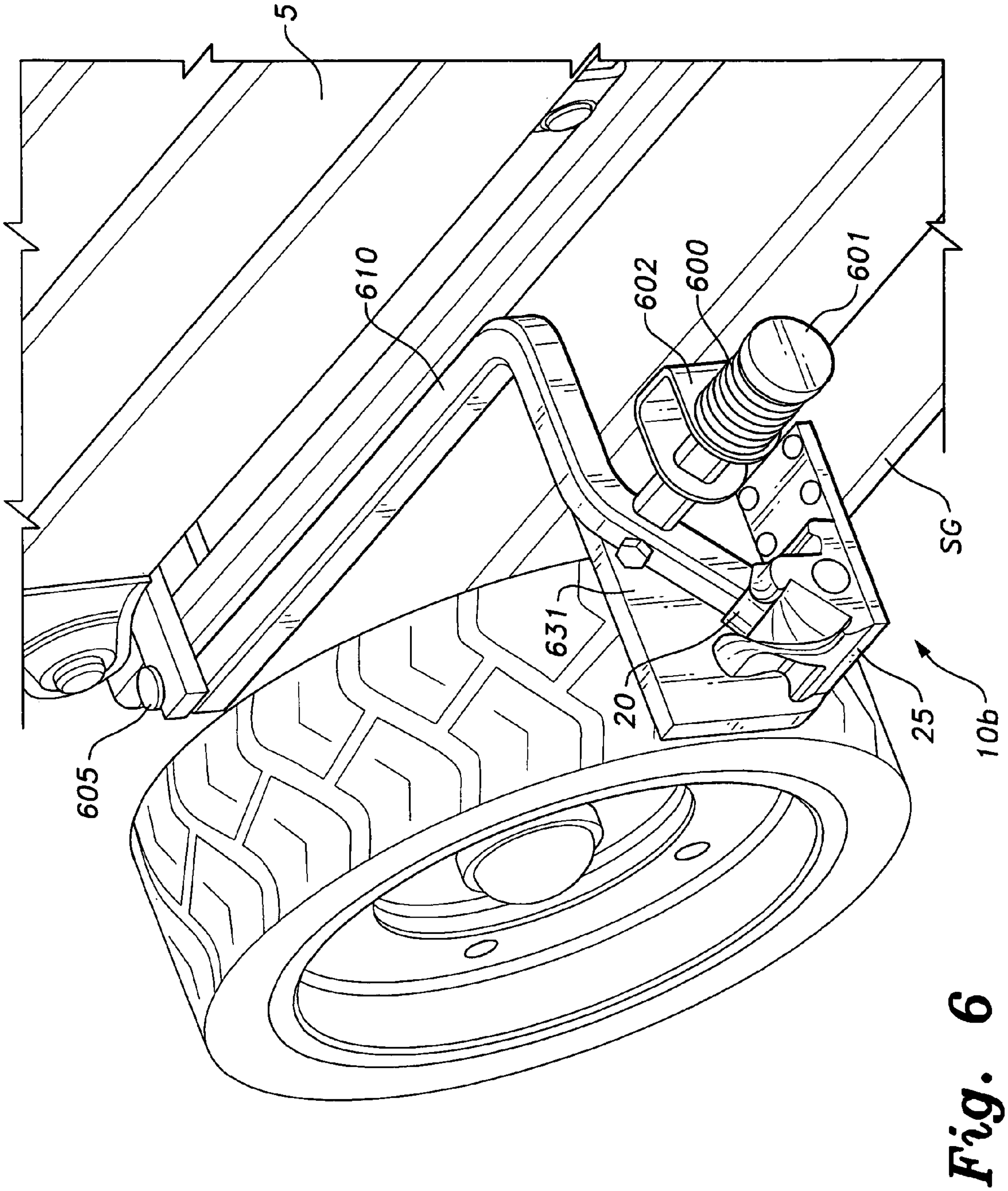
FIG. 6 is an environmental, perspective view of a second embodiment of a safety guard mechanism for a lifting device according to the present invention, showing the safety guard in a stowed position.
Figure 7:
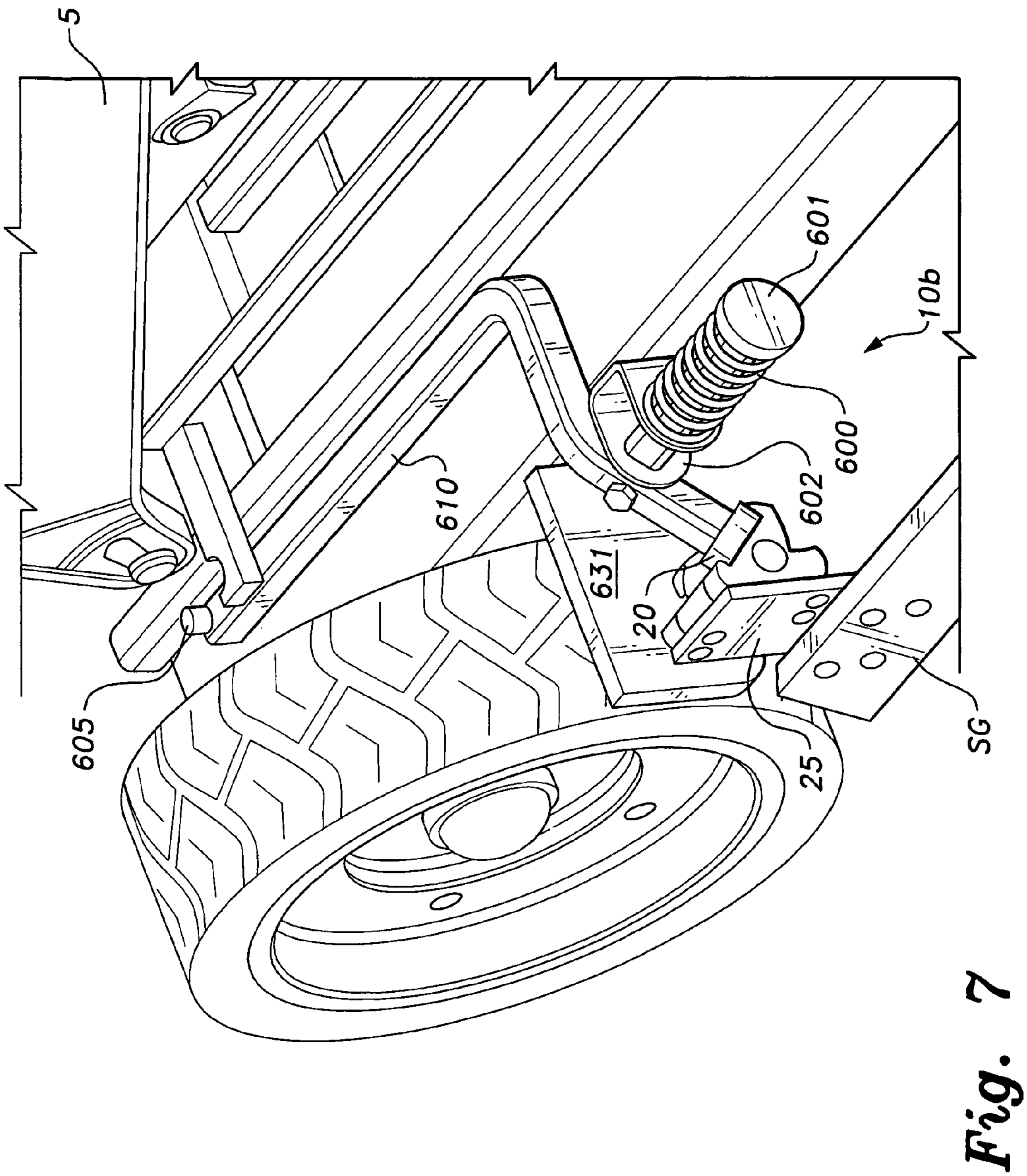
FIG. 7 is an environmental, perspective view of the safety guard mechanism of FIG. 6, showing the safety guard in a deployed position.
Figure 8:
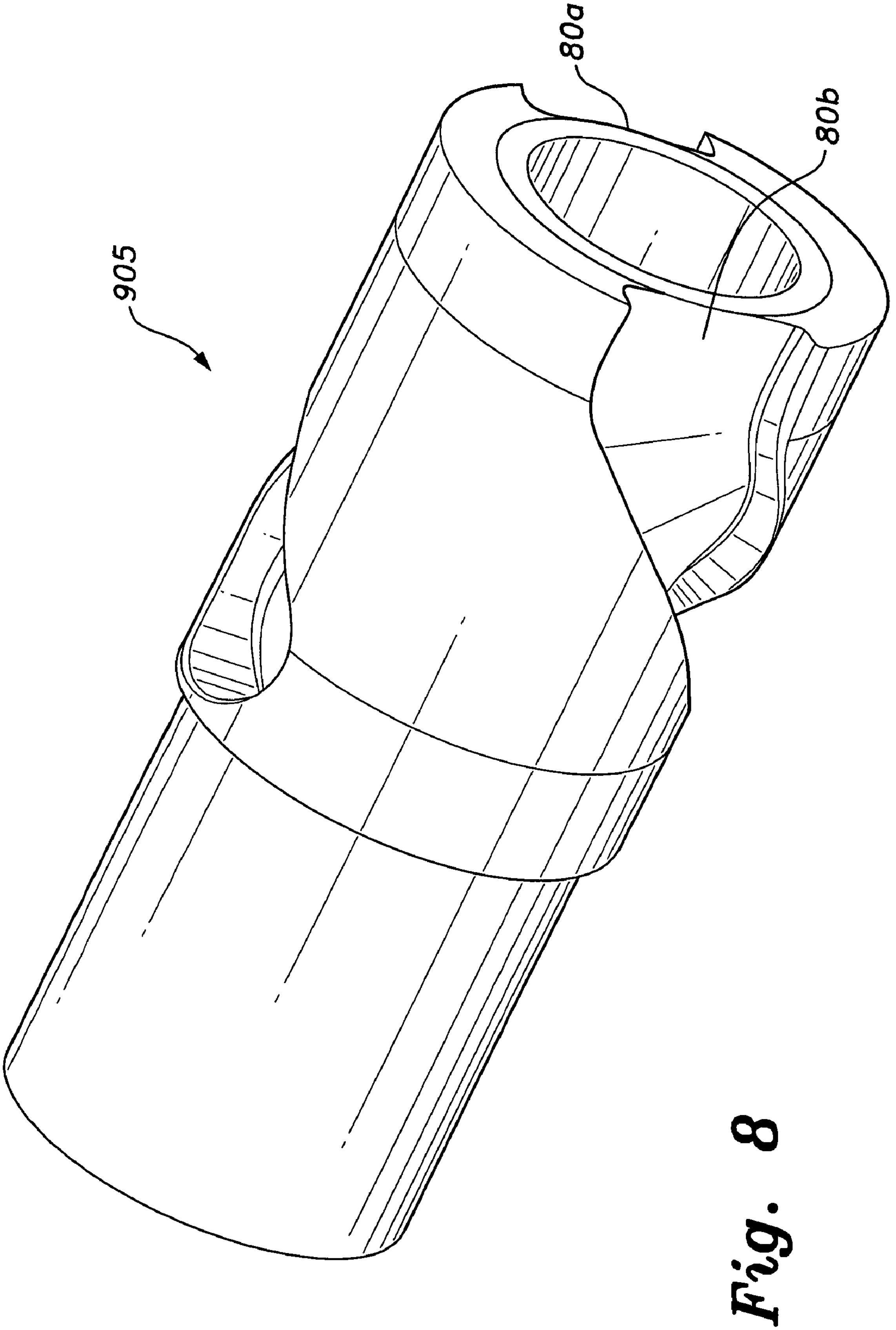
FIG. 8 is a perspective view of a twin helical channel rotator for a safety guard mechanism for a lifting device according to the present invention.

A second embodiment of the safety guard mechanism 10*b* is shown in FIGS. 6-7 and comprises reciprocal operation of translation member 610 through the rotator body 25 via force of a resilient coil spring 600. Kinetic driving member 601 has a head and a non-cylindrically shaped shaft to retain coil spring 600, which is coaxially disposed over the shaft of the kinetic driving member 601. Kinetic driving member anti-rotation bracket 602 is fixed to a chassis member of aerial lift vehicle 5. The kinetic driving member anti-rotation bracket 602 has holes that match the shape and size of the shaft of kinetic driving member 601. The driving member 601 is slidably attached to the bracket 602 via its shaft through the matching holes of bracket 602. The end of kinetic driving member 601 farthest away from the coil spring 600 is rigidly attached to translation member 610, thus constraining rotational movement of the translation member 610 in order to impart maximum rotational torque to rotator body 25, the rotator body being rotatably attached to lifting device 5 via rotator body attachment plate 631.

FIG. 7 shows how the kinetic driving member 601, under compressive force from spring 600, enables linear motion of the translation member 610 to deploy safety guard SG when the slider contact knob 605 is no longer constrained by the linkset member of aerial lift vehicle 5. The kinetic driving member 601 conveniently replaces functionality of the extended straight channel of system 10*a*. Once the safety guard SG extends, it will be self-locked in the extended position until the slider contact knob 605 is once again constrained by the linkset member of aerial lift vehicle 5.

Figure 5:
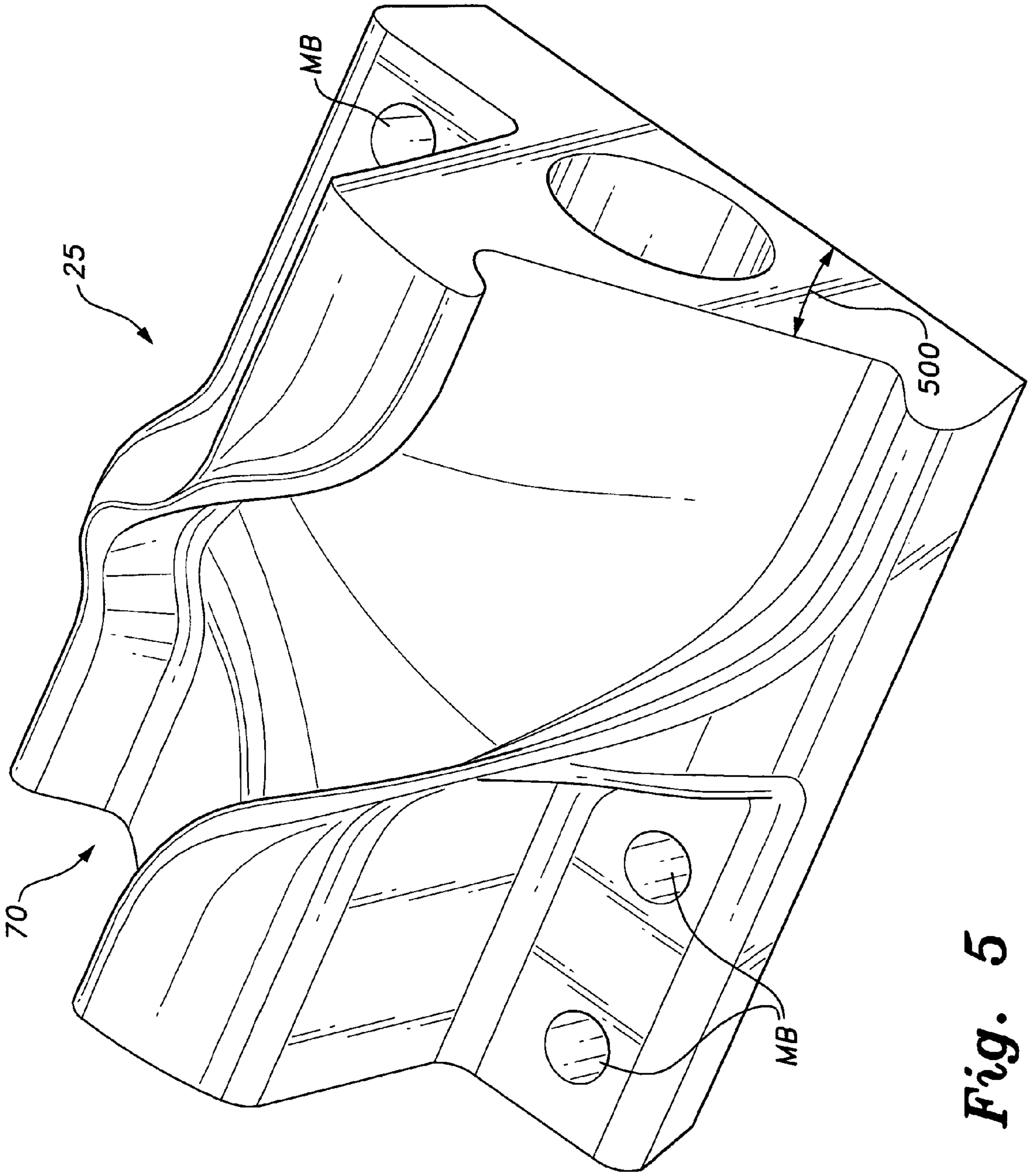
FIG. 5 is a perspective view of the rotator block for a safety guard mechanism for a lifting device according to the present invention.

Additionally, as shown in FIG. 5, the rotator body 25 can be fabricated in cast steel or extrusion plastic to provide a preferably 45° entrance angle 500 with respect either to a horizontal or vertical plane, having a 90° turning angle and a 135° exit angle. This optional choice of entrance angle for roller engagement into the helical channel conveniently provides a platform in which other components in the mechanism 10*b* can be adjusted for ease of installation in a limited space environment. Additionally, mounting bores MB are disposed in the base of rotator body 25 and are adapted for mounting the safety guard SG to the rotator 25.

Figure 11:
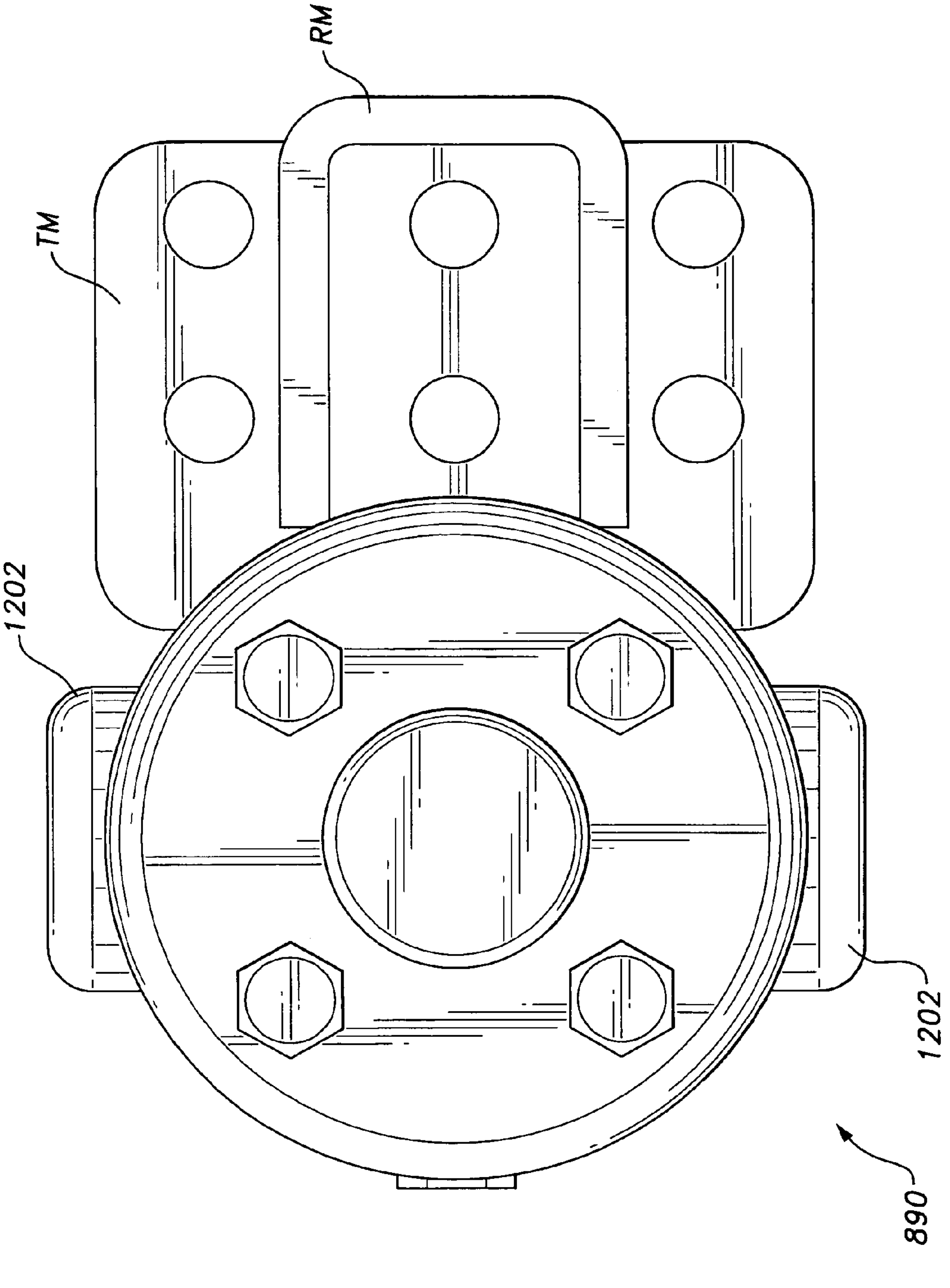
FIG. 11 is a top view of the rotator translator assembly for the safety guard mechanism of FIG. 9.
Figure 12:
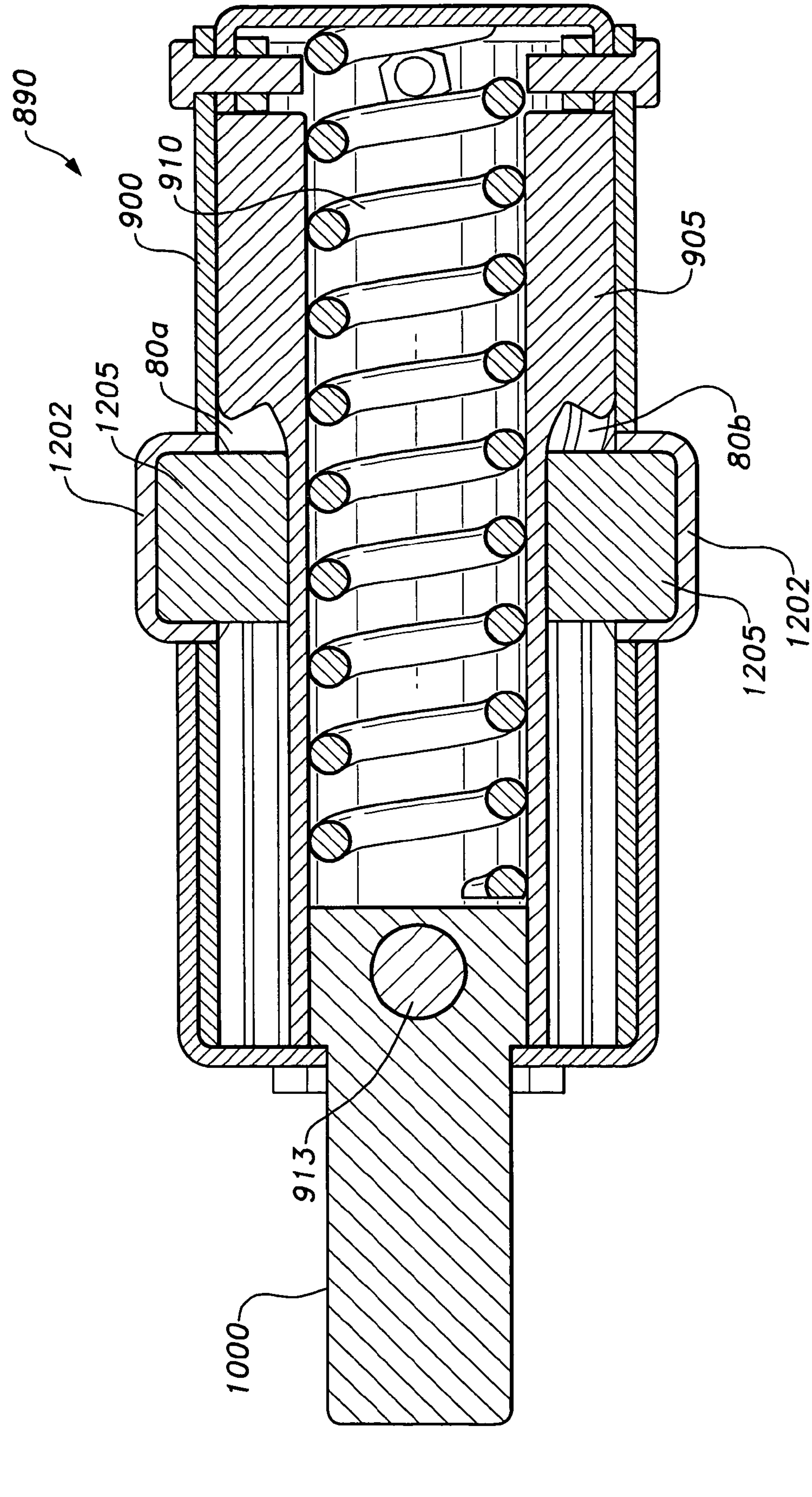
FIG. 12 is a section view of the rotator translator assembly of the safety guard mechanism of FIG. 9.
Figure 13:
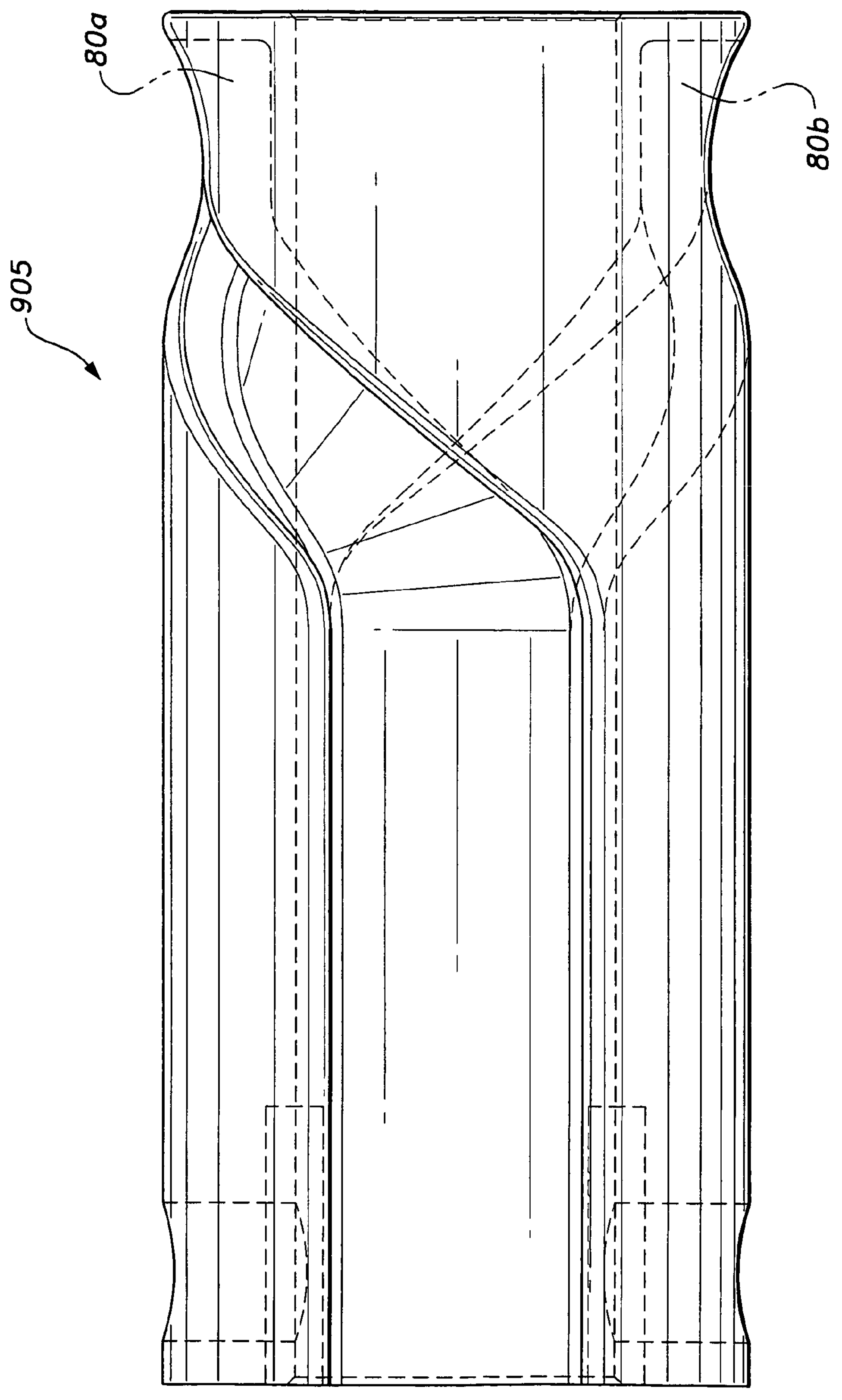
FIG. 13 is a plan view of the rotator body for the safety guard mechanism of FIG. 9.
Figure 14:
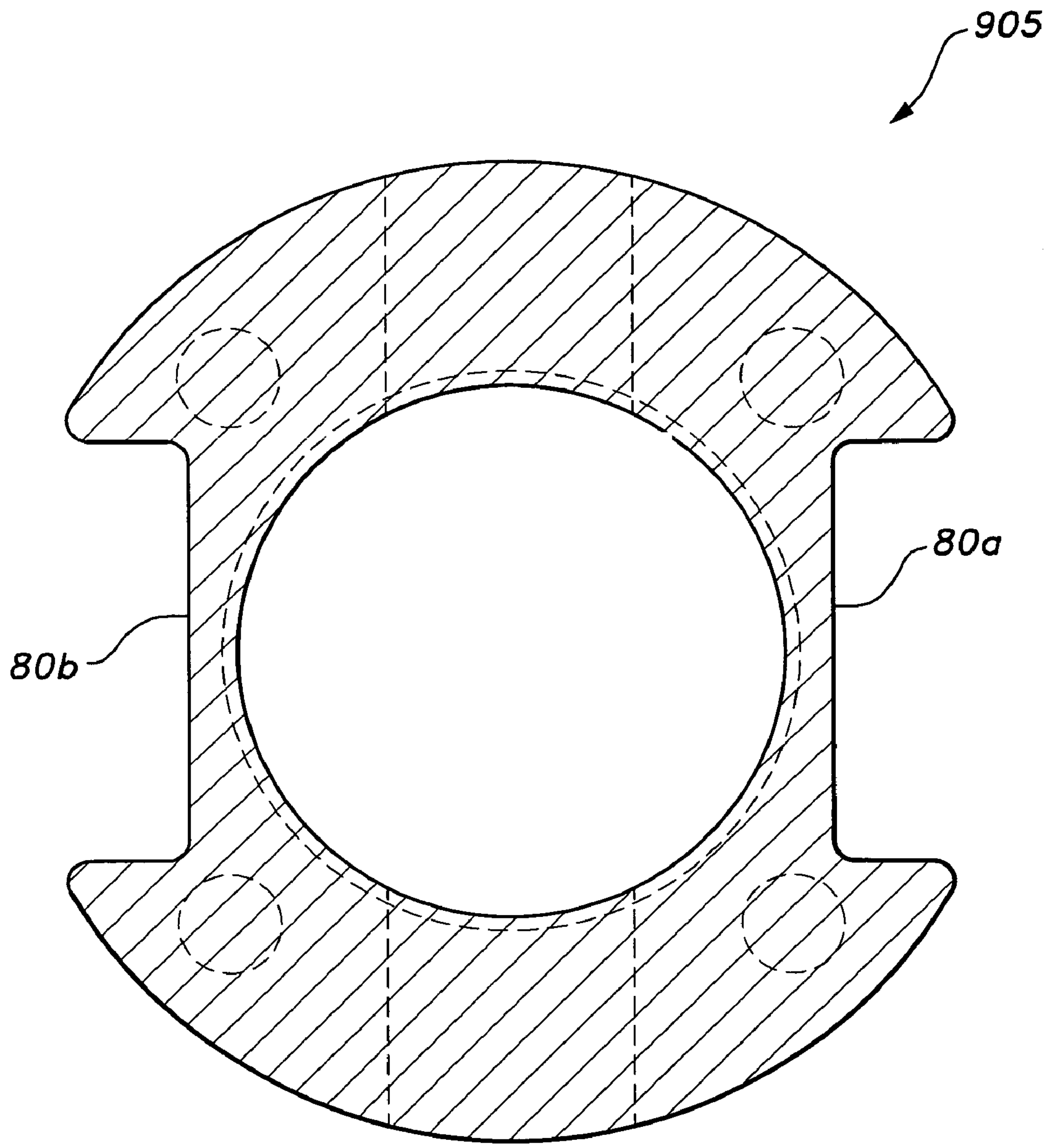
FIG. 14 is a section view of the rotator body of FIG. 13.

A third embodiment of the safety guard mechanism 10*c* is shown in FIGS. 8-12 and comprises rotator 905, translator 900 and spring 910, all in a coaxial chamber 890. As shown in FIGS. 13 and 14, the rotator 905 comprises a hollow cylindrical body that has twin helical channels 80*a* and 80*b*. The plurality of helical channels on rotator 905 can help to increase the turning torque in an even more compact dimension than the aforementioned mechanisms 10*a* and 10*b*.

Figure 9:
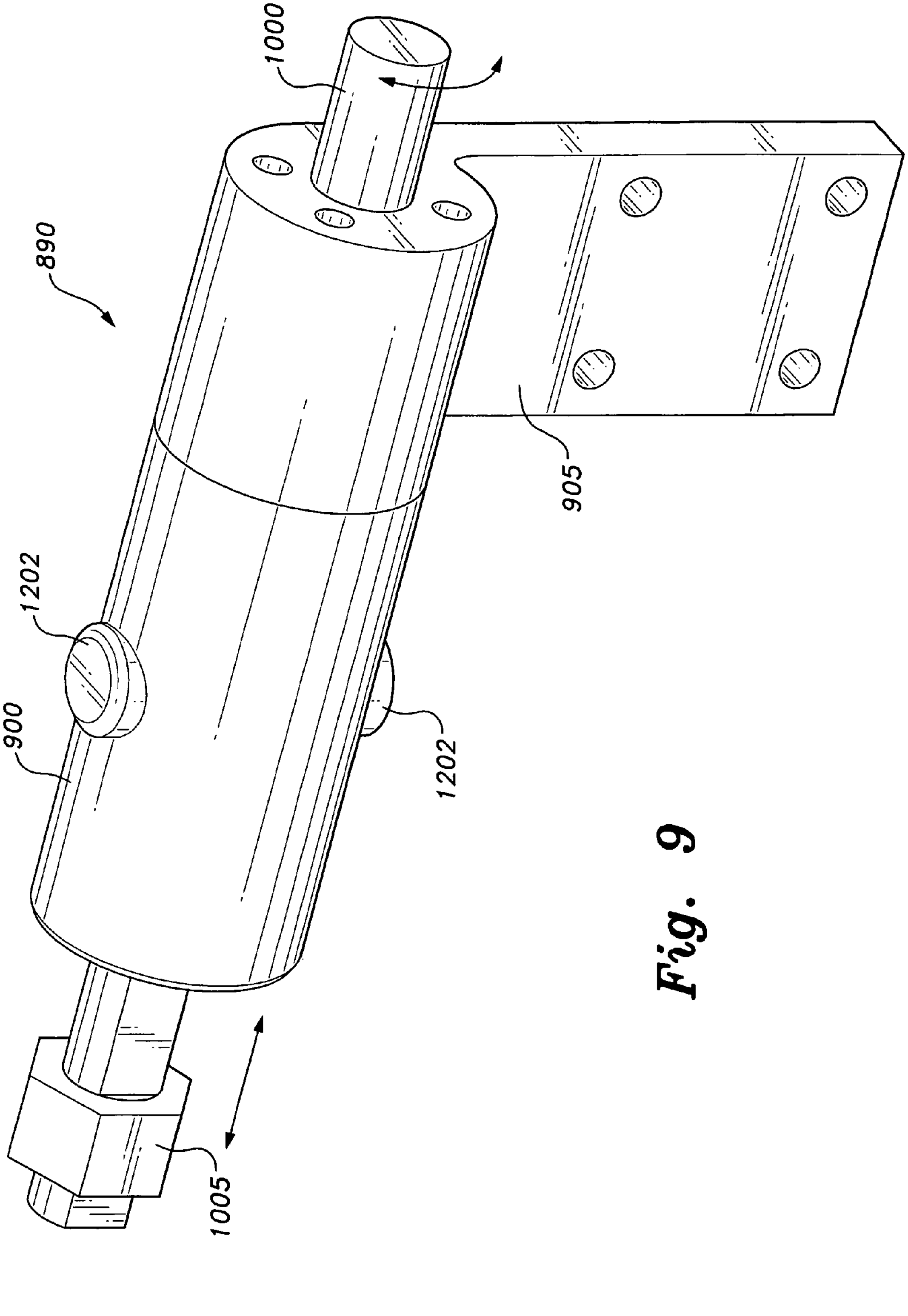
FIG. 9 is a perspective view of a third embodiment of a translator rotator driving set for a safety guard mechanism for a lifting device according to the present invention.
Figure 10:
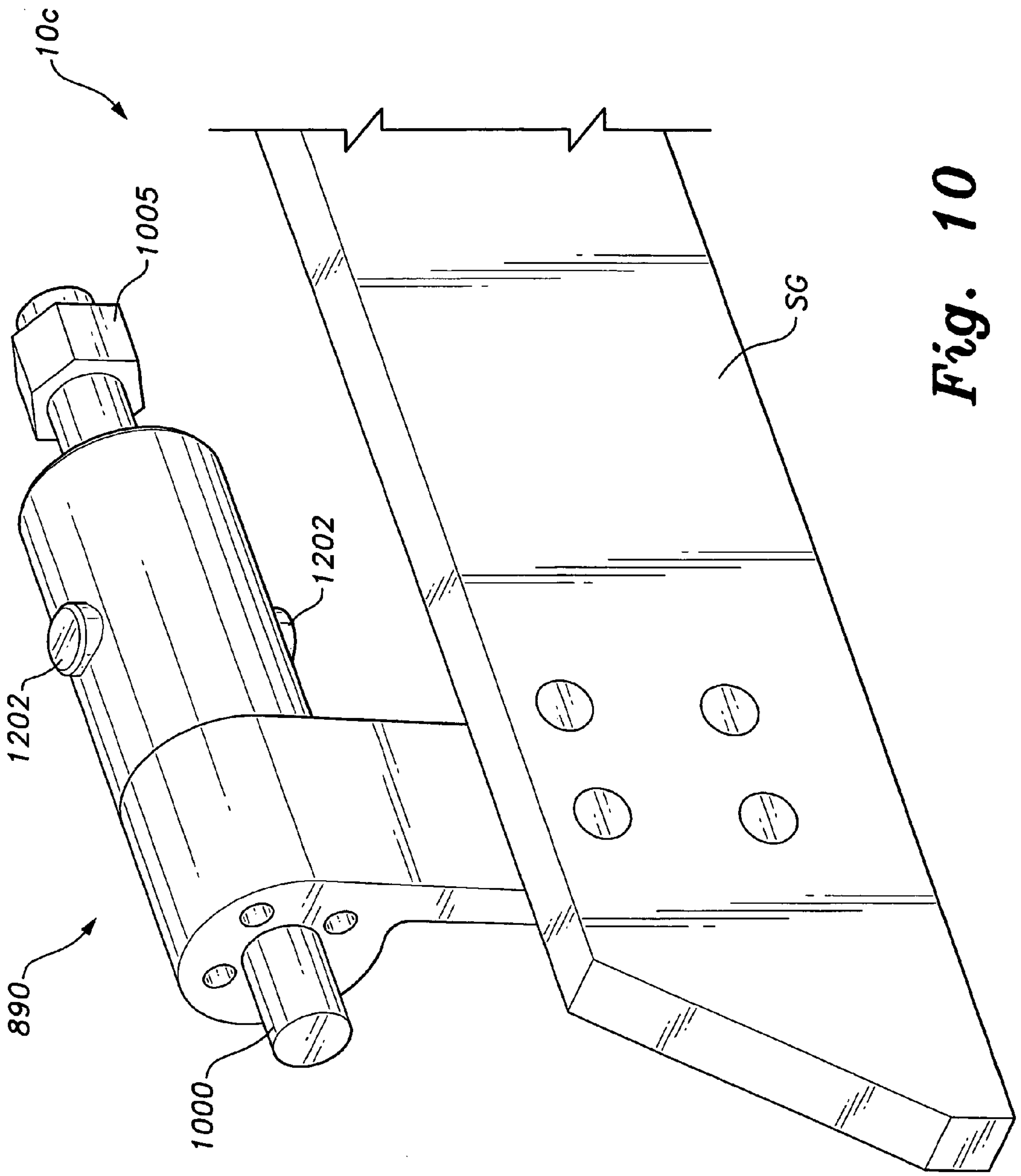
FIG. 10 is a perspective view of the safety guard mechanism of FIG. 9, showing the translator rotator driving set connected to the safety guard.

The mechanism 10*c*, referred to by the inventor as a helical screw latch HSL, may be compact, e.g., four inches in length and 1.75 inches in diameter, with a total weight of approximately 2.50 Lbs. As shown in FIG. 9, the translator 900 is simply moved along the axis of the rotator 905 to cause rotational movement of the rotator 905. As shown in FIG. 12, the compression spring 910 is set in the hollow space of the rotator 905. Translator roller bearings 905 engage helical channels 80*a* and 80*b*. External caps 1202 are provided as protective covers for the roller bearings 1205. Safety guard pivot pin 1000 is securely attached to the rotator body 905 via pivot pin lock member 913. Translation drive attachment nut 1005 is provided for attachment to a linearly moving member that can drive translation member 900 of the coaxially chambered unit 890.

Figure 15A:
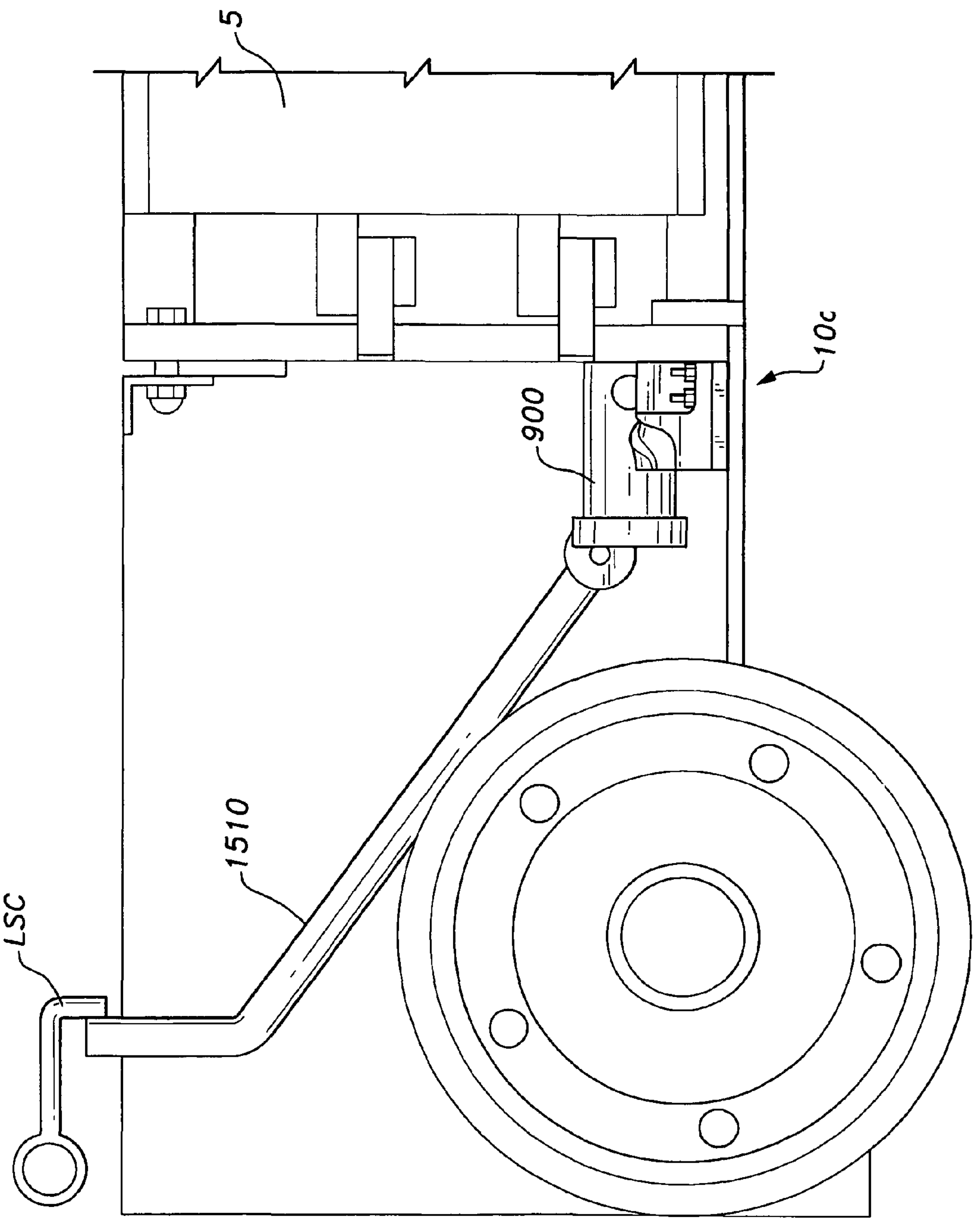
FIG. 15A is a diagrammatic front view of the safety guard mechanism of FIG. 9, showing the safety guard retracted.
Figure 15B:
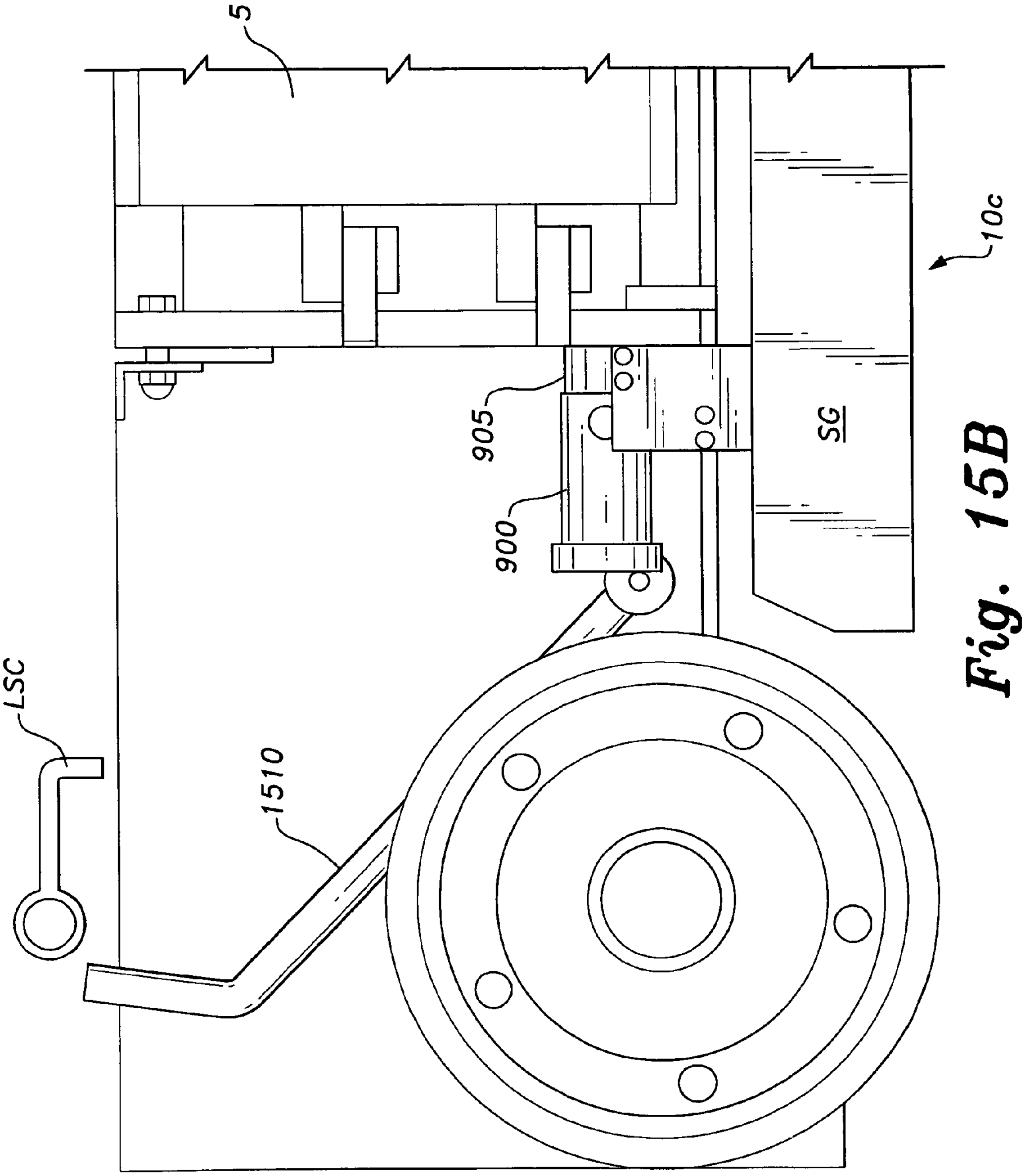
FIG. 15B is a diagrammatic front view of the safety guard mechanism of FIG. 9, showing the safety guard deployed to prevent tipping of the lifting device.

Deployment of the safety guard mechanism 10*c* is shown in FIGS. 15A-15B. The mechanism 10*c* offers a compact, economical way to safely operate the safety guards SG in a plurality of commercial designs.

In order to keep the safety guard SG in a retracted configuration, an elongate translation carrier 1510 is pivotally attached to aerial lift vehicle 5 and engages translation member 900 to provide linear motion to the translation member 900 in opposition to spring bias provided by spring 910 inside rotator body 905. Engagement of the translation carrier 1510 to the translation member 900 is retained by linkset coupling member LSC of aerial lift vehicle 5. When the linkset of aerial lift vehicle 5 begins to move in response to a rising platform of aerial lift vehicle 5, the linkset coupling member LSC releases translation carrier 1510, which is free to pivot away from rotator body 905, thereby allowing the force of compression spring 910 to impart kinetic drive to translation member 900, thereby causing rotator body 905 to rotate to deploy the safety guard SG.

Moreover, a sliding channel may be provided in the translation member 900 for engagement with translation carrier 1510 in order to limit vertical displacement of translation carrier 1510 as the translation carrier 1510 pivots. Additionally, while a single translation carrier 1510 is shown, it should be understood that if the sliding position of linkset coupler LSC is quite distant away from the safety guard turning point, multiple linkage systems could be introduced to carry the translation from the linkset sliding coupler LSC down to the rotator 900. As shown in FIG. 11, a rotator mounting plate RM may be attached to the rotating portion of coaxial chamber 890, while a translation mounting plate TM may be attached to the translating (linear moving) part of the coaxial chamber 890. The translation carrier 1510 may be slidably attached to the translation mounting plate TM, and the safety guard SG may be mounted to the rotator mounting plate RM.

It should be noted that mechanisms 10*b* and 10*c*, a female rotator and male translator may be substituted into the mechanism. Moreover, in lieu of utilizing a compression spring to drive linear motion in the translation member, a suitably configured extension spring may be used.

It is to be understood that the present invention is not limited to the embodiment described above, but encompasses any and all embodiments within the scope of the following claims.

I claim:

1. A safety guard mechanism for a lifting device, comprising:

a lifting device having a lifting member including a slidable linkset member, the lifting device having a frame;

an elongated safety guard pivotally attached to the frame of the lifting device, the safety guard being pivotal between a retracted position adjacent the frame and an extended position proximate ground to prevent the lifting device from tipping over;

a rotator body fixed to the safety guard, the rotator body having an elongated channel defined therein, the channel having a helical portion extending over a portion of the length of the rotator body;

a slider arm attached to the slidable linkset member and constrained to slide linearly when the lifting member is raised, the slider arm having a free end; and a roller attached to the free end of the slider arm, the roller being rotatably disposed in the channel;

wherein linear motion of the slider arm when the lifting member is raised pivots the safety guard to the extended position, and linear motion of the slider arm pivots the safety guard to the retracted position when the lifting member is lowered.

2. The safety guard mechanism for a lifting device according to claim 1, further comprising a helical screw latch self-locking the slider arm in the extended and retracted positions.

3. The safety guard mechanism for a lifting device according to claim 1, wherein one-quarter of a helical thread lead distance displacement of the roller through the rotator channel causes a 90° rotation of the rotator body.

4. The safety guard mechanism for a lifting device according to claim 1, wherein the rotator body channel has an approximately 45° entrance angle with respect to the horizontal and vertical body axis planes, and a 135° exit angle with respect to said planes.

5. The safety guard mechanism for a lifting device, according to claim 1, further comprising a spring inside the rotator, the spring biasing the safety guard mechanism in the extended position.

6. The safety guard mechanism for a lifting device according to claim 1, wherein the rotator channel further comprises a straight linear lead-in channel section merging with the beginning of the helical portion of the channel.

7. The safety guard mechanism for a lifting device according to claim 1, wherein the rotator channel further comprises a straight linear lead-out channel section merging with the end of the helical portion of the channel.

8. The safety guard mechanism for a lifting device according to claim 1, further comprising a spring in operable communication with the slider arm, the spring biasing the safety guard locked in the extended position.

9. The safety guard mechanism for a lifting device according to claim 1, further comprising an anti-rotation bracket in operable communication with the slider arm, the anti-rotation bracket constraining rotational movement of the slider arm, thereby imparting maximum rotational torque to the rotator body.

10. The safety guard mechanism for a lifting device according to claim 1, further comprising a cylindrical casing housing the rotator and a rotator engaging translator portion of the slider arm, the rotator-engaging translator portion of the slider arm being coaxially positioned with respect to the rotator.

11. The safety guard mechanism for a lifting device, according to claim 10, further comprising:

opposing helical channels disposed in the rotator body; and translator roller bearings engaging the opposing helical channels, the rotator-engaging translator portion of the slider arm being in operable communication with the translator roller bearings, the slider arm being linked to the slidable linkset member of the lift device, the slidable linkset member driving the translator to cause the rotator body to extend and retract the safety guards.

12. The safety guard mechanism for a lifting device according to claim 11, further comprising a plurality of couplings operably connecting the translator to the slidable linkset member.

* * * * *